United States Patent
Lin

(10) Patent No.: US 10,277,760 B2
(45) Date of Patent: Apr. 30, 2019

(54) PRINTER

(71) Applicant: Avision, Inc., Hsinchu (TW)

(72) Inventor: Chia-Hsin Lin, Hsinchu (TW)

(73) Assignee: Avision Inc. (TW)

( * ) Notice: Subject to any disclaimer, the term of this patent is extended or adjusted under 35 U.S.C. 154(b) by 142 days.

(21) Appl. No.: 14/990,128

(22) Filed: Jan. 7, 2016

(65) Prior Publication Data

US 2016/0212285 A1 Jul. 21, 2016

(30) Foreign Application Priority Data

Jan. 16, 2015 (TW) .................................. 104101394

(51) Int. Cl.
*H04N 1/00* (2006.01)

(52) U.S. Cl.
CPC ..... *H04N 1/00734* (2013.01); *H04N 1/00687* (2013.01); *H04N 1/00745* (2013.01); *H04N 1/00755* (2013.01)

(58) Field of Classification Search
None
See application file for complete search history.

(56) References Cited

U.S. PATENT DOCUMENTS

| 6,443,546 B1 | 9/2002 | Takagi |
| 6,794,633 B2 | 9/2004 | Iwasaki |
| 2005/0050423 A1* | 3/2005 | Yasukawa ................ B41J 29/38 714/742 |
| 2013/0236197 A1* | 9/2013 | Yoshida ............. G03G 15/0886 399/12 |
| 2015/0029563 A1* | 1/2015 | Tao .................... H04N 1/00771 358/498 |
| 2016/0179031 A1* | 6/2016 | Anderson ............ G03G 15/556 399/12 |

FOREIGN PATENT DOCUMENTS

| CN | 101025594 A | 8/2007 |
| CN | 201040422 Y | 3/2008 |
| CN | 102152640 A | 8/2011 |
| TW | 201121799 A1 | 7/2011 |

* cited by examiner

*Primary Examiner* — Frantz Bataille

(57) ABSTRACT

A printer is disclosed, which comprises a frame, an image forming module, a controller, a light guide unit, and an optical detector. The image forming module is disposed opposite to the frame and forms a passage. The light guide unit is disposed in the frame and is connected to the controller. The optical detector comprises an illuminating part and a receiving part. The illuminating part illuminates a beam to the light guide d unit, and the receiving part is for receiving the light.

4 Claims, 6 Drawing Sheets

PRINTER

The current application claims a foreign priority to application number 104101394 filed on Jan. 16, 2015 in Taiwan.

BACKGROUND OF THE INVENTION

Field of the Invention

The present invention relates to a printer, and more particularly, the present invention relates to a printer with functions of detecting an installing status of an image forming module and a feeding status.

Description of Related Art

In general, a mechanical detector is usually applied to detect whether a paper pass through a passage of a printer by a trigger of paper. But, the above design results that the detector can't detect whether the image forming module is installed in the upper of the housing properly in the period of detecting the pass of paper. An imaging consumable installed in the image forming module need to remove and replace new one after a period of time. Take the mechanical detector for example, if the image forming module is detected firstly by the mechanical detector (mechanical detector is pressed by the image forming module), the mechanical detector is no longer be triggered by papers. This is, the mechanical detector can't detect the pass of paper. However, the image forming module need to be detected for confirming whether the installation of the image forming module is completed so as to execute the follow-up feeding process and image forming process. Thus, the printer applied the mechanical detector for detecting papers needs to an additional mechanism to detect the image forming module. For example, a chip and a circuit board are installed in the image forming module and the frame under the image forming module respectively for sensing whether the image forming module is adjacent. As a result, at least two sets of the chip and the circuit board are needed, and the production costs be increased.

SUMMARY OF THE INVENTION

Accordingly, an object of the present invention is to provide a printer having a detector with functions of detecting an installing status of the image forming module and grasping a feeding status accurately, and the detector have the advantages of simple structure and low cost.

To achieve the foregoing and other objects, a printer is provided. The printer comprises a frame, an image forming module, a controller, a light guide unit, and an optical detector. The image forming module is disposed opposite to the frame, and a passage is formed between the image forming module and the frame. The light guide unit is disposed in the image forming module. The optical detector is disposed in the frame and opposite to the light guide unit, the optical detector is coupled to the controller, the optical detector comprises an illuminating part for emitting a light to the light guide unit and a receiving part for receiving the light.

BRIEF DESCRIPTION OF THE DRAWINGS

Other features and advantages of the present invention will become apparent in the following detailed description of the preferred embodiments with reference to the accompanying drawings, of which.

DESCRIPTION OF EMBODIMENTS

Figure 1:
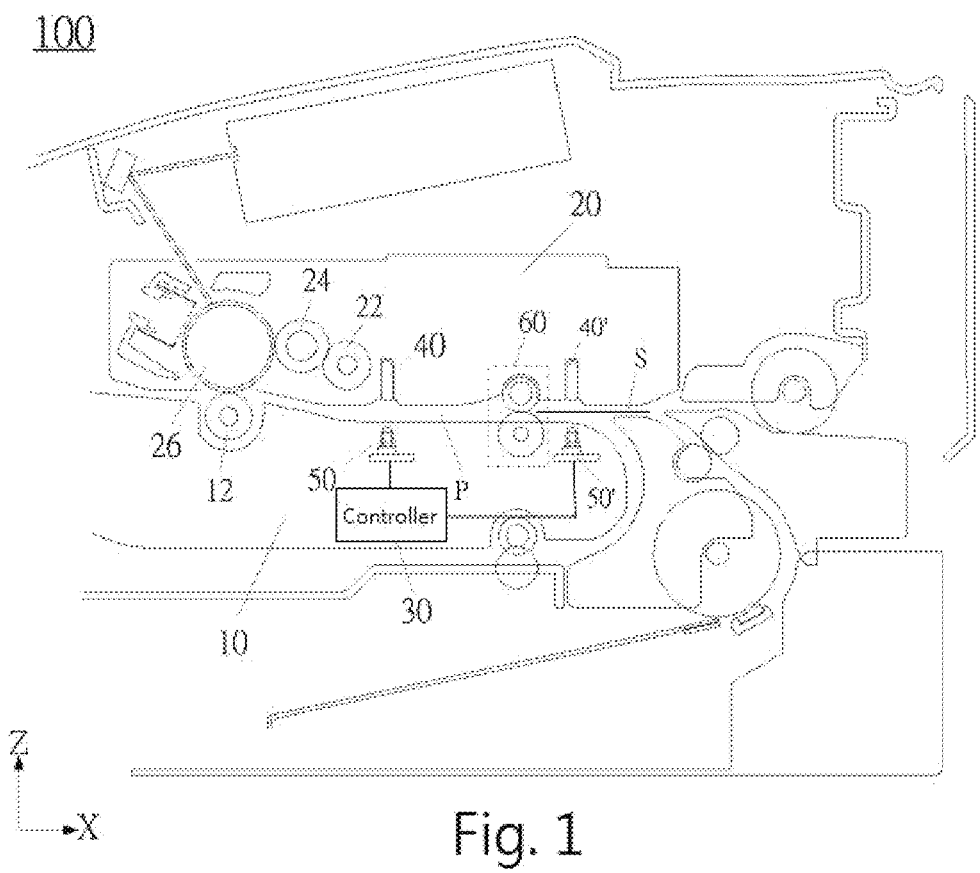
FIG. 1 is a schematic view illustrating a printer according to one embodiment of the present invention.

FIG. 1 is a schematic view illustrating a printer according to one embodiment of the present invention. Referring to FIG. 1, a printer 100 includes a frame 10, an image forming module 20 disposed opposite to the frame, a controller 30, a light guide unit 40, and an optical detector 50. A passage P is formed between the image forming module 20 and the frame 10. The image forming module 20 is detachable to install in the printer. The printing consumable (not shown) is installed inside of the image forming module, such as a toner cartridge, and an ink supply, etc. When the printing consumable is exhausted, the image forming module 20 can be detached to replace. Except the printing consumable, the image forming module 20 further includes a regulating roller 22, a developing roller 24, and a photosensitive drum 26. Take the toner cartridge as the printing consumable for example, the toners are coated on the developing roller 24 by the regulating roller 22 uniformly, the toners on the developing roller 24 are further adsorbed to the charged region of the photosensitive drum 26 for forming an image. The frame 10 includes a transfer roller 12 disposed opposite to the photosensitive drum 26, and the toners are transferred on a paper S by the transfer roller 12 and the photosensitive drum 26 jointly. The light guide unit 40 is disposed in one side of the image forming module 20 which is close to the passage P. The light guide unit 40 can be a light guide post or a reflective sheet.

Figure 2:
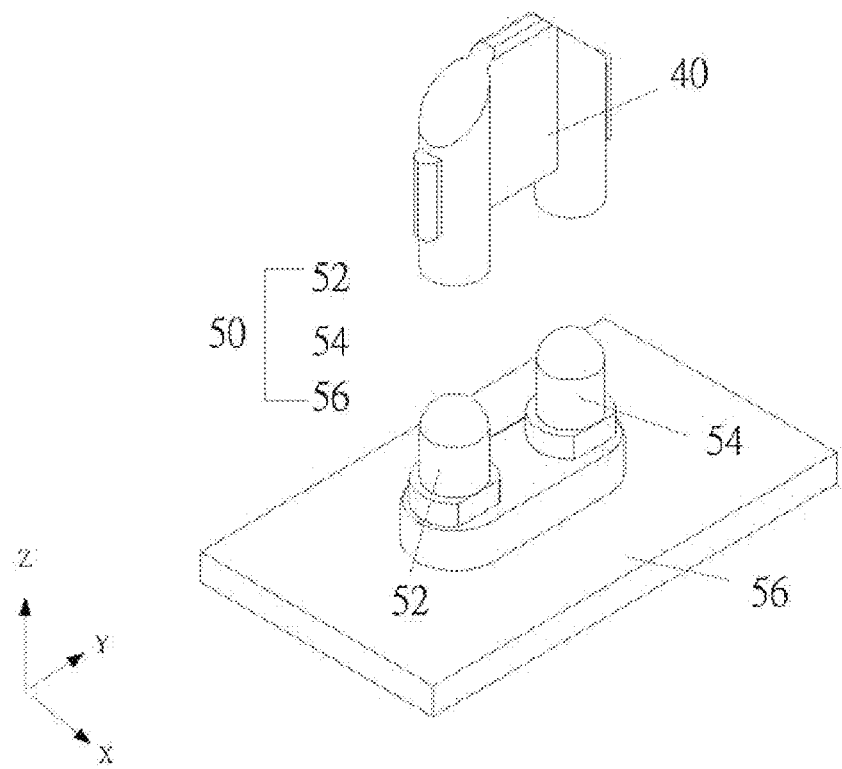
FIG. 2 is a three dimensional schematic view illustrating the optical detector and the light guide unit depicted in FIG. 1.
Figure 3:
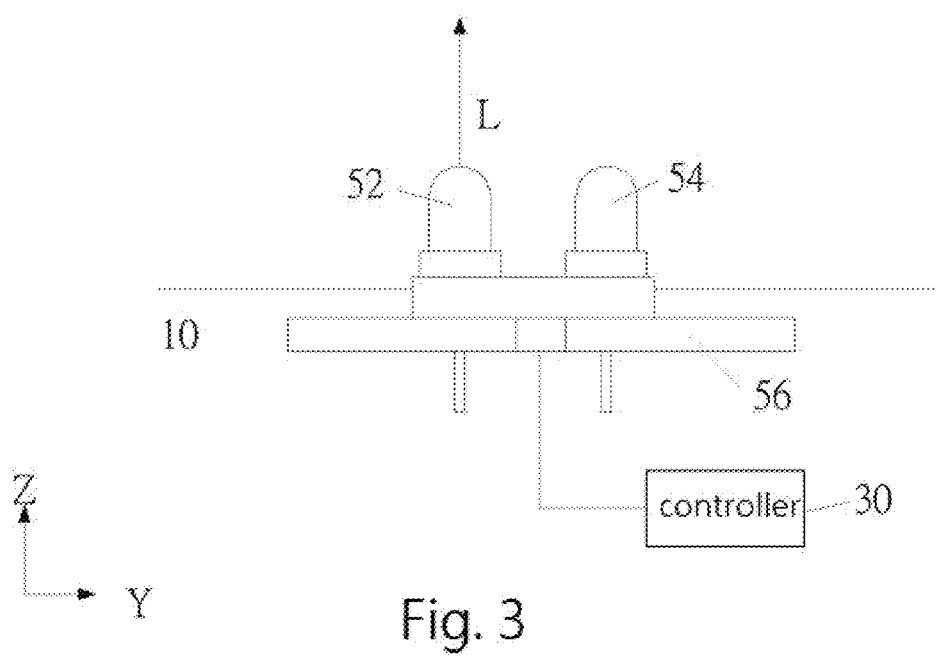
FIG. 3 is a schematic view illustrating the optical detector disposed on the frame depicted in FIG. 1, wherein the image forming module is uninstalled.

FIG. 2 is a three dimensional schematic view illustrating the optical detector and the light guide unit depicted in FIG. 1. Referring to FIG. 2, the optical detector 50 including an illuminating part 52, a receiving part 54, and a circuit board 56 connected to the receiving part 54 is used for transforming the light L received by the receiving part 54 to the electronic signal. The electronic signal is sent to the controller 30 for determining whether the image forming module 20 is installed or not. The optical detector 50 is disposed opposite to the light guide unit 40. The illuminating part 52 is used for emitting light L to the light guide unit 40. FIG. 3 is a schematic view illustrating the optical detector disposed on the frame depicted in FIG. 1, wherein the image forming module is uninstalled. Referring to FIG. 3, the optical detector 50 is disposed in the frame 10 and is coupled to the controller 30. However, due to the image forming module 20 is uninstalled, so that the light L emitted from the illuminating part 52 can't transmit to the receiving part 54. Then, the controller 30 determines the image forming module 20 is uninstalled when the light L is not received by the receiving part 54. Based on the infrared light with low light penetration, the optical detector 50 is an infrared optical detector preferably, including but not limited in the present invention. In one embodiment of the present invention, the illuminating part 52 is a infrared light illuminating part, and the receiving part 54 is a infrared light receiving part. The infrared light illuminating part and the infrared light receiving part are configured on the circuit board 56, wherein the infrared light illuminating part is disposed aside the infrared light receiving part. The circuit board 56 is configured in the frame 10 and coupled to the controller 30.

Figure 4A:
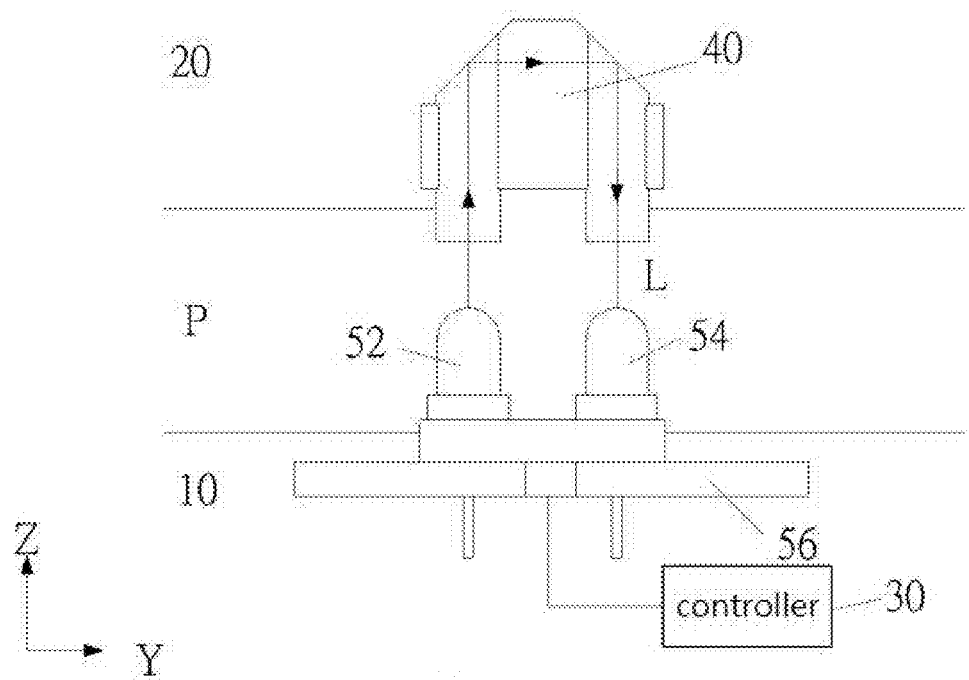
FIG. 4A is a schematic view illustrating the optical detector disposed on the frame depicted in FIG. 1, wherein the image forming module is installed.

FIG. 4A is a schematic view illustrating the optical detector disposed on the frame depicted in FIG. 1, wherein the image forming module is installed. Referring to FIG. 4A, when the image forming module 20 installed, the optical detector 50 is disposed opposite to the light guide unit 40. The passage P is formed between the frame 10 and the image forming module 20, the passage P is used for paper S to pass. The light L emitted from the illuminating part 52 transmits through the light guide unit 40, and the light L be guided to the receiving part 54 by light guide unit 40. The receiving part 54 is used to receive the light L, and the light L received by the receiving part 54 is transformed to a electronic signal by the circuit board 56, and then the electronic signal be sent to the controller 30. In the status, the controller 30 determines the image forming module 20 is install when the light L is received by the receiving part 54. In FIG. 4A, the light guide unit 40 is a light guide post, and the light guide unit 40 can be a reflective sheet in another embodiment.

Figure 4B:
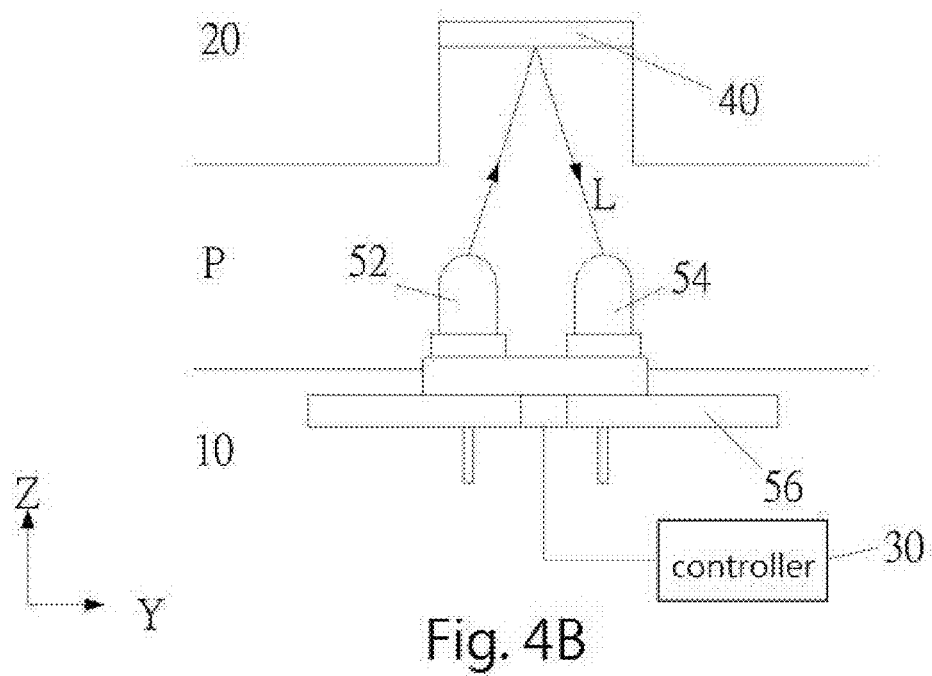
FIG. 4B is a schematic view illustrating another light guide unit.

FIG. 4B is a schematic view illustrating another light guide unit. Referring to FIG. 4B, the light guide unit 40 is the reflective sheet, the light L is emitted in an angle by the illuminating part 52, and the light L is reflected to the receiving part 54 by the reflective sheet 40. Similarly, the controller 30 determines the image forming module 20 is install when the light L is received by the receiving part 54.

Figure 5A:
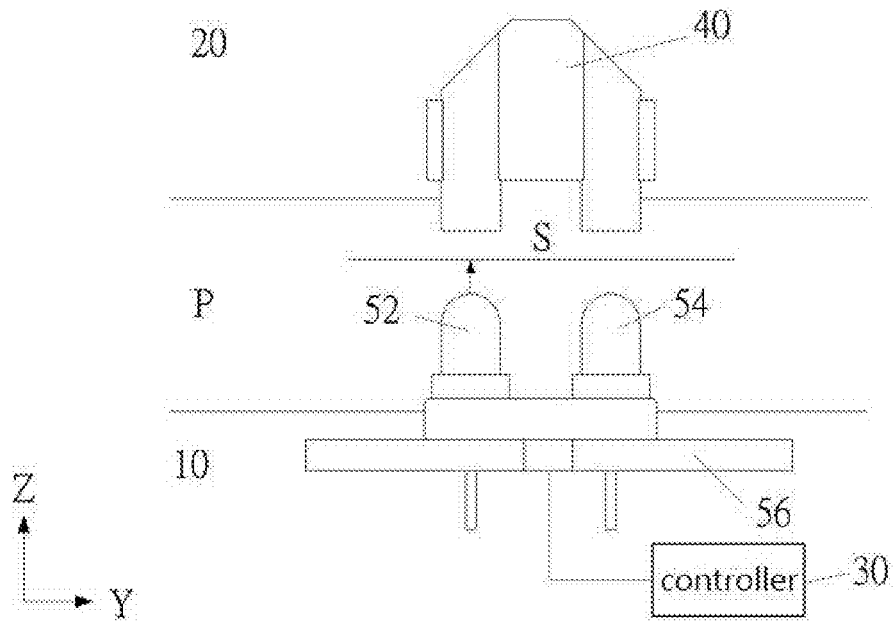
FIG. 5A is a schematic view illustrating a paper passing through the passage and the optical detector.
Figure 5B:
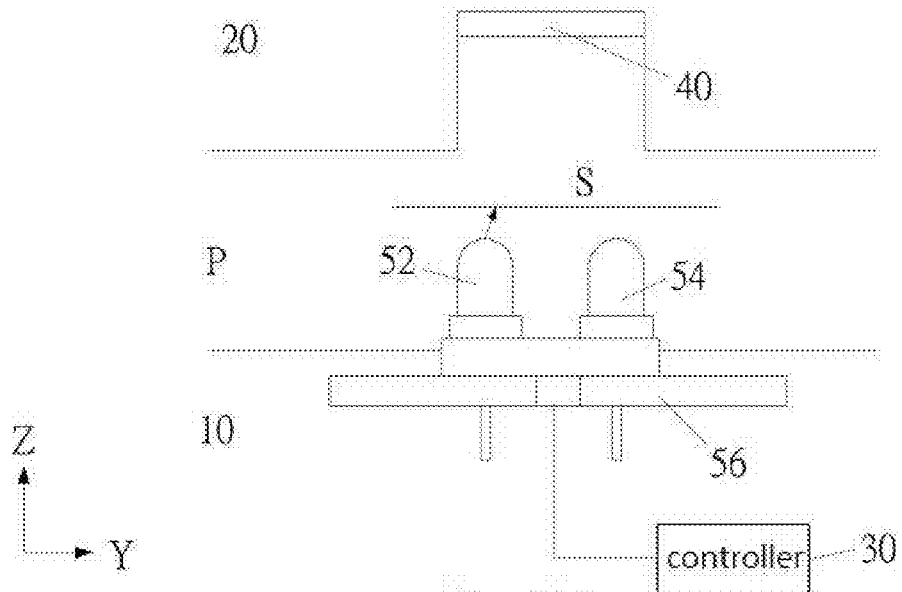
FIG. 5B is a schematic view illustrating of another light guide unit.

After confirming of the installation of the image forming module 20, the controller 30 further sends a feeding signal to request a feeder 60 to feed a paper S into the passage. Referring to FIG. 1, the paper S is feed into the passage P by the feeder 60, and pass through the optical detector 50 and the light guide unit 40. FIG. 5A is a schematic view illustrating a paper passing through the passage and the optical detector. Referring to FIG. 5A, the paper S can pass through the passage P, and the illuminating part 52 still emits the light L in the same time continuously (or intermittently in short cycle). When the paper S is just passed through the optical detector 50, the light L is blocked by the paper S temporarily, so that the receiving part 54 can't receive the signal. The controller 30 determines the paper S passes through the passage P according to the temporary block of the light L caused by the paper S. FIG. 5B is a schematic view illustrating of another light guide unit. Referring to FIG. 5B, similarly, the receiving part 54 can't receive the signal because the paper S passes temporarily.

Figure 6:
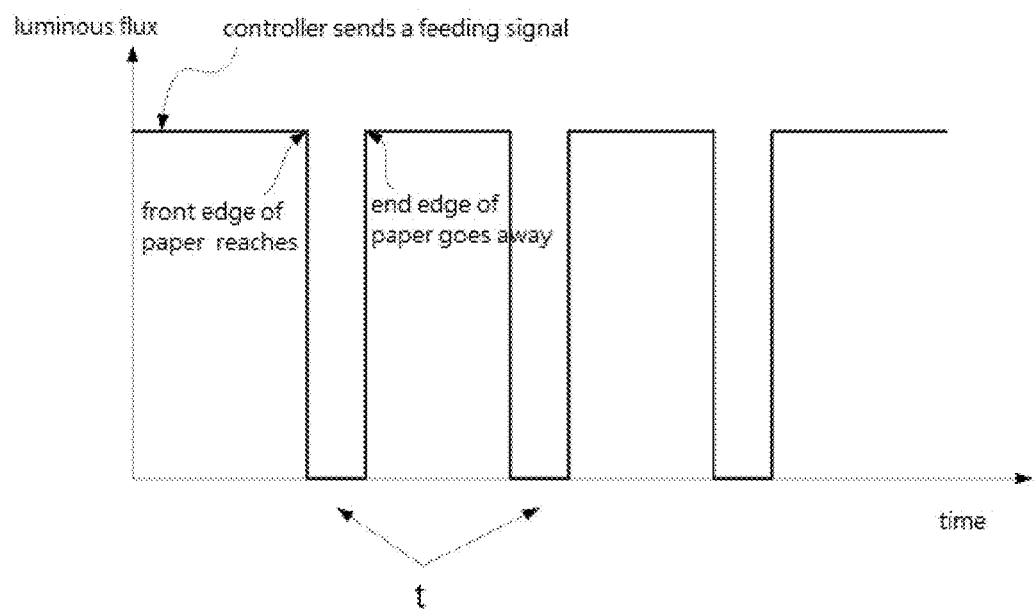
FIG. 6 is a schematic view illustrating relationship between luminous flux and time of the optical detector.

FIG. 6 is a schematic view illustrating relationship between luminous flux and time of the optical detector. Referring to FIG. 6, when the controller 30 confirms that light L is received by the receiving part 54, the controller 30 sends a feeding signal to request a feeder 60 to feed a paper S into the passage P. In a transferring process of the paper S in the passage P, the illuminating part 52 emits light L continuously, and the receiving part 54 keep to receive the light L until the front edge of the paper S reaching the optical detector 50. The time interval t represents the light L is not received by the receiving part 54 in a predetermined time when the paper S passes through the optical detector 50 temporarily. When the end edge of the paper S goes away the optical detector 50 and the front edge of next paper doesn't reach to the optical detector 50, the light L is received continuously by the receiving part 54 again. For example, as shown in FIG. 6, three sheets are transferred by the feeder 60. The controller 30 can further estimate the required time that the paper S reaches to the optical detector 50 and the time interval t after sending the feeding signal according to the transmission speed of the feeder 60 and the disposition of the optical detector 50. Thus, the feeding status can be controlled accurately.

Figure 7A:
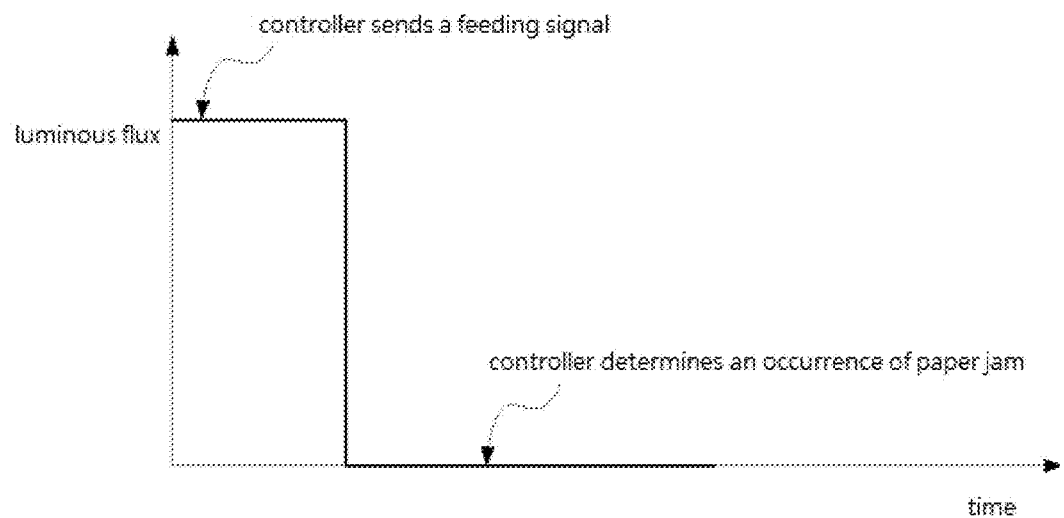
FIG. 7A is a schematic view illustrating relationship between luminous flux and time in one status of paper jam.

FIG. 7A is a schematic view illustrating relationship between luminous flux and time in one status of paper jam. Referring to FIG. 7A, the controller 30 sends a feeding signal to request a feeder 60 to feed a paper S into the passage P after confirming the light L is received by the receiving part 54. When the front edge of the paper S reaches the optical detector 50 and the duration of the receiving part 54 without receiving the light L is over a predetermined time, this represents that the paper S doesn't go away from the optical detector 50. The controller 30 determines an occurrence of paper jam in the passage P, wherein the location of paper jam is near to the disposition of the optical detector 50. The predetermined time can be determined by the controller 30 in advance, and the warning of paper jam will be sent for users when the duration of the receiving part 54 without receiving the light L is over the predetermined time. For example, the warning of paper jam will be represented in a warning light or be displayed in an interface.

Figure 7B:
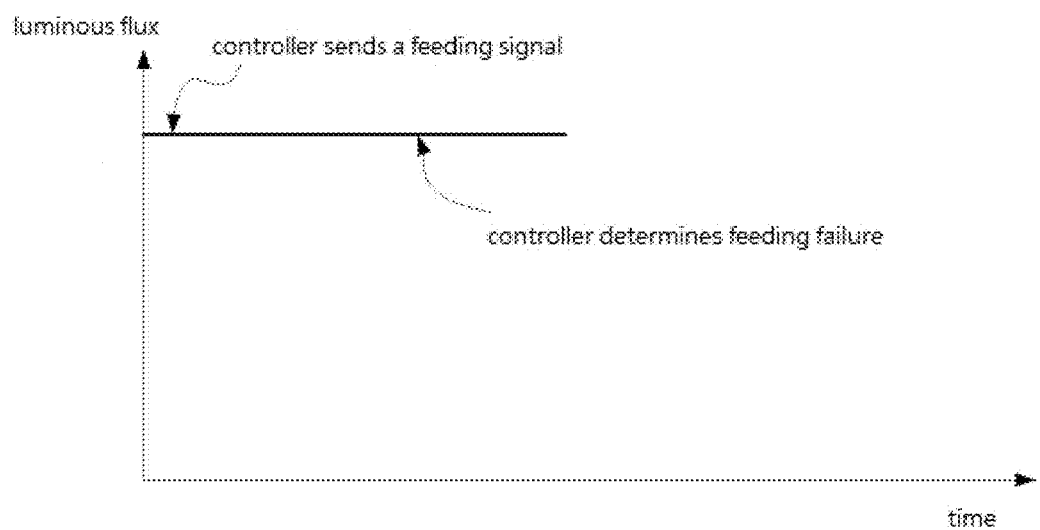
FIG. 7B is a schematic view illustrating relationship between luminous flux and time in another status of paper jam.

FIG. 7B is a schematic view illustrating relationship between luminous flux and time in another status of paper jam. Referring to FIG. 7B, the controller 30 sends a feeding signal to request a feeder 60 to feed a paper S into the passage P after confirming the light L is received by the receiving part 54. The light L is still received by the receiving part 54 continuously when a predetermined time is over, this represents that the front edge of the paper S still doesn't reach the optical detector 50. The controller 30 determines the feeding failure of the feeder 60 (a tray out of paper), or a paper jam occurred in the passage P, wherein the location of paper jam is occurred in front of the optical detector 50. Similar to previous paragraph, the predetermined time can be determined by the controller 30 in advance, and the user will be warned when the duration of the receiving part 54 with receiving the light L is over the predetermined time. Referring to FIG. 1 again, a second optical detector 50' and a second light guide unit 40' can be set in front of the feeder 60 for further distinguishing the status of feeding failure or paper jam occurred in the passage P, wherein the structures of the second optical detector 50' and the second light guide unit 40' are similar to the structures of the optical detector 50 and light guide unit 40 respectively. The second optical detector 50' is also coupled to the controller 30, the difference between the optical detector 50 and the second optical detector 50' just be in the disposing location. The second optical detector 50 coordinated with the second light guide unit 40 can detect whether the paper S passes through the feeder 60, and the controller 30 determines the feeding failure or a paper jam occurred in the passage P according to the previous detecting result.

From above, the printer of the present invention can solve the issue that the mechanical detector can't detect the installing status of the image forming module. The printer of the present invention not only can detect the installing status of the image forming module, but also can control the feeding status after confirming the installation of the image forming module, even can determine the occurring location of paper jam. In addition, the printer of the present invention be with simple structure, and just need to install a set of the chip and the circuit board. Thus, the printer of the present invention also be with low cost.

While the disclosure has been described by way of example and in terms of the preferred embodiments, it is to be understood that the disclosure is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A printer, comprising:
   a frame;
   an image forming module disposed opposite to the frame, and a passage formed between the image forming module and the frame;
   a controller;
   a light reflective sheet disposed in the image forming module; and
   an infrared light detector disposed in the frame, opposite to the light reflective sheet, and coupled to the controller; wherein, the infrared light detector comprises an infrared light illuminating part for emitting a light to the light reflective sheet and a infrared light receiving part for receiving the light;
   wherein the light is transmitted to the infrared light receiving part through the light reflective sheet;
   wherein the light is reflected to the infrared light receiving part by the light reflective sheet;
   wherein the controller determines the image forming module is uninstalled when the light is not received by the infrared light receiving part;
   wherein the controller determines the image forming module is installed when the light is received by the infrared light receiving part;
   wherein the controller determines a feeding status of a paper passed through the passage according to whether or not the infrared light receiving part receives the light emitted from the infrared light illuminating part;
   wherein the infrared light illuminating part and the infrared light receiving part are disposed in the frame, opposite to the light reflective sheet, and coupled to the controller;
   wherein the light detector further comprises a circuit board configured in the frame and coupled to the controller;
   wherein the infrared light illuminating part and the infrared light receiving part are configured on the circuit board;
   wherein the infrared light illuminating part is disposed aside the infrared light receiving part;
   wherein the circuit board is connected to the infrared light receiving part for transform the light received by the infrared light receiving part to a electronic signal;
   wherein the electronic signal is sent to the controller for determining whether the image forming module is installed or not.

2. The printer of claim 1, wherein the controller further sends a feeding signal to request a feeder to feed the paper into the passage, and the controller determines the paper passes through the passage according to the temporary block of the light.

3. The printer of claim 1, wherein the controller further sends a feeding signal to request a feeder to feed the paper into the passage, and the controller determines an occurrence of paper jam in the passage according to the block of the light over a predetermined time.

4. The printer of claim 1, wherein the controller further sends a feeding signal to request a feeder to feed the paper into the passage, and the controller determines the feeding failure of the feeder according to the unblock of the light in a predetermined time.

* * * * *